United States Patent
Lan et al.

(10) Patent No.: US 11,193,606 B2
(45) Date of Patent: Dec. 7, 2021

(54) ELECTRIC VALVE

(71) Applicant: Zhejiang Sanhua Intelligent Controls Co., Ltd., Shaoxing (CN)

(72) Inventors: Yaofeng Lan, Zhejiang (CN); Yingchong Lu, Zhejiang (CN); Rongrong Zhang, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 8 days.

(21) Appl. No.: 16/641,048

(22) PCT Filed: Jun. 5, 2018

(86) PCT No.: PCT/CN2018/089858
§ 371 (c)(1),
(2) Date: Feb. 21, 2020

(87) PCT Pub. No.: WO2019/037510
PCT Pub. Date: Feb. 28, 2019

(65) Prior Publication Data
US 2020/0240539 A1    Jul. 30, 2020

(30) Foreign Application Priority Data

Aug. 24, 2017 (CN) .......................... 201710737711.0

(51) Int. Cl.
*F16K 27/12* (2006.01)
*F16K 31/02* (2006.01)
(Continued)

(52) U.S. Cl.
CPC ............ *F16K 31/02* (2013.01); *F16K 27/029* (2013.01); *F16K 1/32* (2013.01); *F16K 27/10* (2013.01); *F16K 27/12* (2013.01); *F25B 41/35* (2021.01)

(58) Field of Classification Search
CPC .......... F16K 1/32; F16K 27/02; F16K 27/029; F16K 27/10; F16K 27/12; F16K 27/102; F16K 31/02; F25B 41/35; Y02B 30/70
(Continued)

(56) References Cited

U.S. PATENT DOCUMENTS

| 4,501,297 A | * | 2/1985 | Baker | ................... F16K 31/042 137/554 |
| 4,650,156 A | * | 3/1987 | Kawahira | ............... F16K 31/04 251/129.11 |

(Continued)

FOREIGN PATENT DOCUMENTS

| CN | 102207224 A | 10/2011 |
| CN | 203348682 U | 12/2013 |

(Continued)

OTHER PUBLICATIONS

First Office Action for Korean Application No. 10-2020-7007657, dated Dec. 4, 2020.
(Continued)

*Primary Examiner* — Matthew W Jellett
(74) *Attorney, Agent, or Firm* — Wolf, Greenfield & Sacks, P.C.

(57) ABSTRACT

An electric valve includes a stator assembly, a rotor, a circuit board assembly, a sleeve and a valve assembly. The stator assembly is arranged around the rotor. The sleeve isolates the stator assembly from the rotor. The stator assembly is electrically connected to the circuit board assembly. A valve port is formed in the electric valve. The rotor can drive the movement of the valve assembly with respect to the valve port. The electric valve further comprises a box body. The circuit board assembly is arranged in the box body. The box body includes a shell and a cover body. A seal ring is arranged at a joint of the shell and the cover body. The seal ring is compressed between the shell and the cover body.

(Continued)

The cover body is fixedly connected to the shell by means of welding.

9 Claims, 4 Drawing Sheets

(51) Int. Cl.
  *F16K 27/02* (2006.01)
  *F16K 1/32* (2006.01)
  *F16K 27/10* (2006.01)
  *F25B 41/35* (2021.01)

(58) Field of Classification Search
  USPC .................................................. 251/129.11
  See application file for complete search history.

(56) References Cited

U.S. PATENT DOCUMENTS

| | | | | |
|---|---|---|---|---|
| 4,723,753 | A * | 2/1988 | Torimoto | F16K 31/04 251/129.05 |
| 5,052,656 | A * | 10/1991 | Katayama | F16K 31/04 251/129.11 |
| 5,318,064 | A * | 6/1994 | Reinicke | F16K 31/04 137/487.5 |
| 6,460,567 | B1 * | 10/2002 | Hansen, III | F16K 31/04 137/554 |
| 6,522,038 | B2 * | 2/2003 | Byram | F02D 11/10 251/129.11 |
| 6,561,480 | B1 * | 5/2003 | Komiya | F16K 31/04 251/129.12 |
| 6,753,629 | B2 * | 6/2004 | Doi | H02K 5/161 310/156.05 |
| 6,955,335 | B2 * | 10/2005 | Kawai | F02D 9/1035 251/129.11 |
| 7,358,632 | B2 * | 4/2008 | Hatano | F16K 31/04 123/568.24 |
| 8,237,318 | B2 * | 8/2012 | Ikitake | H02K 11/215 310/68 B |
| 8,684,036 | B1 | 4/2014 | Satoda | |
| 10,352,475 | B2 * | 7/2019 | Uehara | F25B 41/31 |
| 2004/0103882 | A1 * | 6/2004 | Kino | F02D 9/1035 123/399 |
| 2006/0175565 | A1 | 8/2006 | Nungesser et al. | |
| 2009/0294713 | A1 | 12/2009 | Harada et al. | |
| 2010/0276616 | A1 * | 11/2010 | Kim | F16K 31/04 251/129.11 |
| 2010/0289442 | A1 * | 11/2010 | Hatano | H02K 11/215 318/400.38 |
| 2010/0301240 | A1 | 12/2010 | Bell et al. | |
| 2013/0036432 | A1 | 2/2013 | Hwang | |
| 2013/0062542 | A1 | 3/2013 | Greeb et al. | |
| 2016/0146366 | A1 | 5/2016 | Takahashi et al. | |

FOREIGN PATENT DOCUMENTS

| | | |
|---|---|---|
| CN | 103814224 A | 5/2014 |
| CN | 103900306 A | 7/2014 |
| CN | 207364390 U | 5/2018 |
| EP | 3 026 373 A1 | 6/2016 |
| JP | 2000-255415 A | 9/2000 |
| KR | 2007-0108516 A | 11/2007 |
| WO | WO 2013/036432 A1 | 3/2013 |

OTHER PUBLICATIONS

International Search Report and Written Opinion for International Application No. PCT/CN2018/089858, dated Aug. 27, 2018.
PCT/CN2018/089858, Aug. 27, 2018, International Search Report and Written Opinion.
Extended European Search Report for European Application No. 18849193.0, dated Apr. 7, 2021.
Office Action for Japanese Application No. 2020-511295, dated Apr. 6, 2021.

* cited by examiner

ELECTRIC VALVE

RELATED APPLICATIONS

The present application is the national phase of International Application No. PCT/CN2018/089858, titled "ELECTRIC VALVE", filed on Jun. 5, 2018, which claims priority to Chinese patent application No. 201710737711.0, titled "ELECTRIC VALVE", filed with the China National Intellectual Property Administration on Aug. 24, 2017. The entire contents of these applications are, incorporated herein by reference in their entirety.

FIELD

The present application relates to the field of fluid control, and in particular to a flow control device.

BACKGROUND

With the increasing requirements for control accuracy, an electric valve serving as the flow regulating device has been gradually used. In order to facilitate control, the electric valve at least includes a circuit board assembly. In order to prevent the circuit board assembly from being corroded, it is required to seal the circuit board assembly, and how to provide an electric valve that can seal the circuit board assembly is an urgent problem to be solved.

SUMMARY

An object of the present application is to provide an electric valve which is simple in structure and can improve the sealing reliability of a circuit board assembly.

To achieve the above object, the following technical solutions are provided according to embodiments of the present application. An electric valve includes a stator assembly, a rotor, a sleeve, and a valve assembly, the stator assembly is provided around the rotor, the sleeve is configured to isolate the stator assembly from the rotor, the electric valve is formed with a valve port, and the rotor is configured to drive the valve assembly to move relative to the valve port, where the electric valve further includes a case and a circuit board assembly, the stator assembly is electrically connected with the circuit board assembly, the circuit board assembly is provided in an inner cavity of the case formed by the case, the case includes a housing and a cover, the housing is not integrally formed with the cover, a seal ring is provided at a connection of the housing and the cover, the seal ring is tightly compressed between the housing and the cover, and the cover is fixedly connected with the housing by welding.

An electric valve includes a stator assembly, a rotor, a sleeve, and a valve assembly, the stator assembly is provided around the rotor, the sleeve is configured to isolate the stator assembly from the rotor, the electric valve is formed with a valve port, and the rotor is configured to drive the valve assembly to move relative to the valve port, where the electric valve further includes a case and a circuit board assembly, the stator assembly is electrically connected with the circuit board assembly, the circuit board assembly is provided in an inner cavity of the case formed by the case, the case includes a housing and a cover, the housing is not integrally formed with the cover, and the cover is fixedly connected with the housing by welding.

The case of the electric valve includes the housing and the cover that are separately formed, which facilitates the molding. The cover is fixedly connected with the housing by welding. Such a sealing structure is advantageous for improving the sealing of the circuit board assembly. Besides, the structure is simple, and the process is simple.

DETAILED DESCRIPTION OF THE EMBODIMENTS

The present application is further illustrated hereinafter in conjunction with drawings and specific embodiments.

The electric valve in this embodiment is mostly used in a refrigeration system for regulating the flow rate of a working medium in the refrigeration system.

Figure 1:
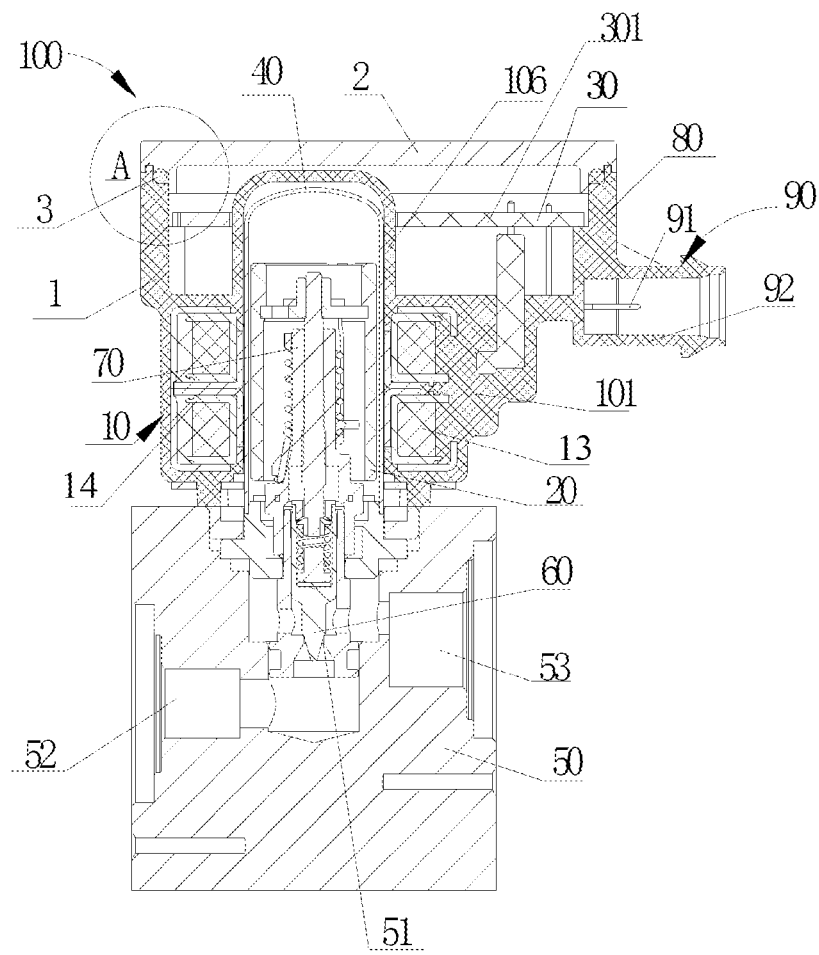
FIG. 1 is a schematic view showing the structure of a first embodiment of an electric valve according to the present application.
Figure 6:
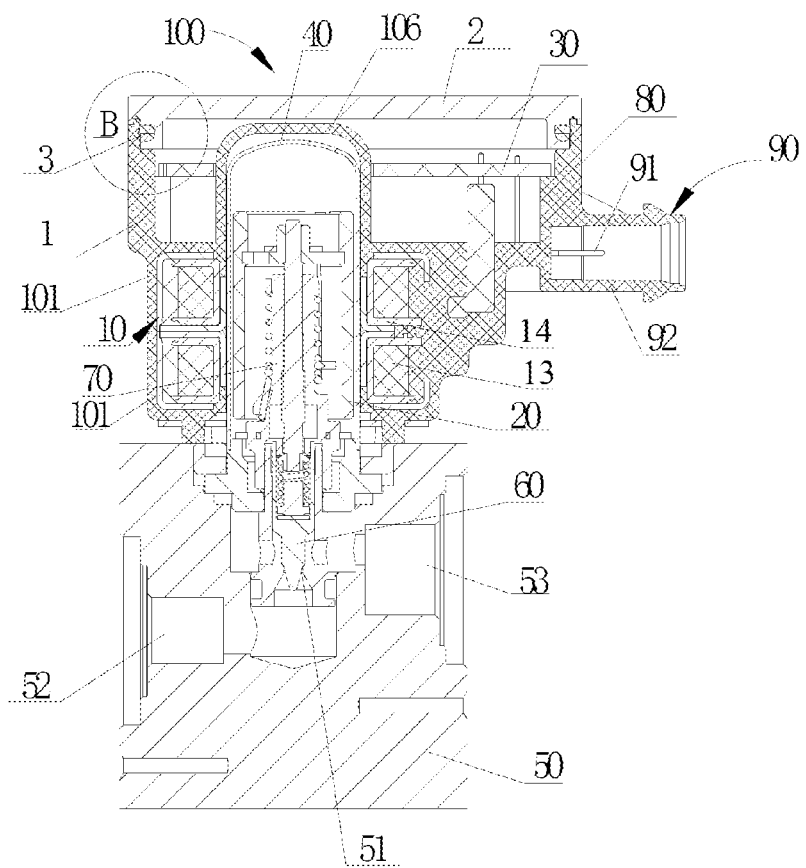
FIG. 6 is a schematic view showing the structure of a second embodiment of the electric valve according to the present application.

Referring to FIGS. 1 and 6, the electric valve 100 includes a stator assembly 10, a rotor 20, a circuit board assembly 30, a sleeve 40, a valve assembly, and a valve body 50, where the stator assembly 10 includes a coil 13 and a bobbin 14, and the valve assembly includes a valve core 60, the electric valve further includes a transmission device 70, the valve body 50 is formed with a valve port 51 or a component fixedly formed with the valve port 51, a first channel 52 and a second channel 53. In the present embodiment, the stator assembly 10 is provided around the rotor 20, that is, the stator assembly 10 is provided at an outer circumference of the rotor 20, and the sleeve 40 is configured to isolate the stator assembly 10 from the rotor 20. The coil 13 of the stator assembly 10 is electrically connected with the circuit board assembly 30, and the rotor 20 is configured to drive the valve core 60 to move. The valve core 60 can move relatively close to or away from the valve port 51, thereby causing an area of a communication section the first channel 52 and the second channel 53 to change and adjusting the flow rate of the system in which the first channel 52 and the second channel 53 are located. For ease of description, the arrangement direction of the valve body, the stator assembly, and the circuit board of the electric valve is defined as an axial direction, and the extension direction of the circuit board is defined as a radial direction, that is, the movement direction of the valve core 60 is defined as the axial direction, the arrangement direction of the stator assembly and the rotor is defined as the radial direction, and the radial direction is perpendicular to the axial direction.

The electric valve 100 includes a case 80, and the circuit board assembly 30 is provided in an inter cavity of the case formed by the case 80. The case 80 includes a housing 1 and a cover 2, the housing is fixedly connected with the cover, the housing 1 and the cover 2 are both made of an injection molding material, the housing 1 is not integrally formed with the cover 2, that is, the housing 1 and the cover 2 are separately formed. The housing may be integrally formed with other members of the electric valve other than the cover, such as the stator assembly, and the cover may be integrally formed with other members of the electric valve other than the housing. As can be seen from the above description, the inner cavity of the case includes an inner cavity of the housing. In order to prevent the circuit board assembly 30 from being corroded, the housing 1 and the cover 2 are required to be sealed. In the present embodiment, a seal ring 3 is provided at a connection of the housing 1 and the cover 2, and the cover 2 is fixedly connected with the housing 1 by ultrasonic welding. Such a sealing structure can meet the sealing requirements, the structure is simple, and the process is simple. The seal ring may not be provided, and the cover 2 is fixedly connected with the housing 1 by ultrasonic welding, such that no additional solder is required, neither a solder-fixing structure is required. Therefore, the structure is simple and is easy to weld.

According to the above description, those skilled in the art can understand that the fixing manner of the cover 2 and the housing 1 is not limited to the above ultrasonic welding, and may be other forms of welding as long as the fixing manner can realize the fixing connection of the cover 2 and the housing 1 and realize the above technical effects.

In the following embodiment, the cover 2 includes a first position-limiting portion and a first fixing portion. The housing 1 includes a second position-limiting portion and a second fixing portion. The seal ring 3 is provided between the first position-limiting portion and the second position-limiting portion, and is compressed tightly by the first position-limiting portion and the second position-limiting portion. The first fixing portion is welded to the second fixing portion, forming a fixing connection portion. The fixing connection portion is closer to an outer edge of the electric valve than the seal ring, that is, the fixing connection portion is located on the periphery of the seal ring. Thus, the seal ring is compressed tightly by welding the cover and the housing, thereby improving the sealing property. Moreover, with the fixing connection portion being arranged closer to the outer edge, the sealing property and the connection reliability are further improved.

In the present embodiment, the electric valve 100 includes an injection molded body. The injection molded body is formed by injection molding with components such as the coil 13 and the bobbin 14 as injection molding inserts. The injection molded body forms an insulating layer 101 of the stator assembly 10 at the periphery of the coil 13 and the bobbin 14. The insulating layer can prevent the stator assembly 10 from being corroded by the working medium or the air. In the present embodiment, the injection molded body further forms the housing 1, such that the housing 1 is integrally formed with the insulating layer 101 of the stator assembly 10. The connection between the thus formed housing 1 and the stator assembly 10 is more reliable, and the connection structure is simpler, which improves the sealing between the housing 1 and the stator assembly 10.

The electric valve 100 further includes a plug portion 90. The plug portion 90 includes a pin 91 and a plug housing 92. The injection molded insert includes the pin 91, and the injection molded body includes the plug housing 92. One end of the pin 91 extends into a socket, and another end of the pin 91 extends into the case 80 to electrically connect with the circuit board assembly 30. In this way, a connection structure between the connecting portion and the housing is not required, so that the overall structure is simpler and the connection is more reliable.

Figure 2:
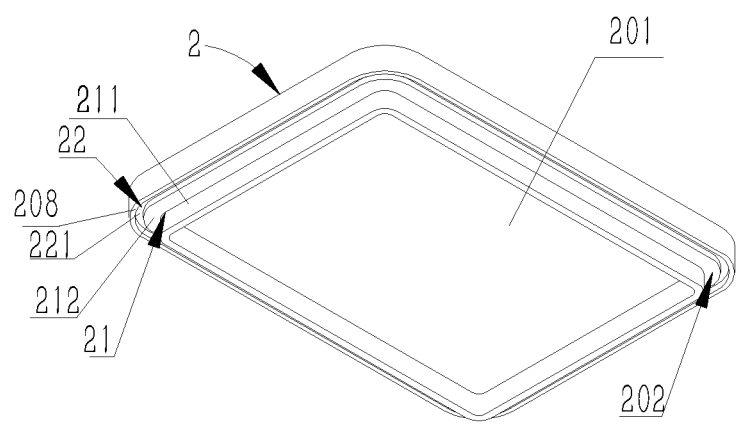
FIG. 2 is a perspective view showing the structure of a cover shown in FIG. 1.

Referring to FIG. 2, the cover 2 includes a base 201 and a connecting portion 202. The connecting portion 202 is integrally injection molded with the base 201, and the cover 2 is connected, fixed and sealed to the housing 1 by the connecting portion 202. The connecting portion 202 includes a first position-limiting portion 21 and a first fixing portion 22, where the first position-limiting portion 21 defines a position of the seal ring 3 relative to the cover 2, and the first fixing portion 22 defines a welding fixing position of the cover 2 relative to the housing 1. The first position-limiting portion 21 includes a first mounting portion 211 and a first abutting portion 212. In the present embodiment, the seal ring 3 is sleeved on the periphery of the first mounting portion 211, and the seal ring 3 is pressed against the housing 1 by the first abutting portion 212. In the present embodiment, the first mounting portion 211 is an annular protrusion, and the inner circumference of the annular protrusion is provided around the base. The first mounting portion 211 may be a discontinuous annular protrusion, such that a structure of the first mounting portion 211 that limits a radial position of the seal ring 3 relative to the cover 2 is within the scope of the present application. The first abutting portion 212 is provided around the periphery of the first mounting portion 211, and the first abutting portion 212 is configured to define an axial position of the seal ring 3 with respect to the cover 2. The seal ring 3 is sleeved on the periphery of the first mounting portion 211, and the seal ring 3 is pressed against the housing 1 by the first abutting portion 212. A width of the first abutting portion 212 is slightly larger than a distance between inner and outer diameters of the seal ring 3, that is, a distance between the periphery of the first mounting portion 211 and the first fixing portion 22 is slightly larger than the distance between the inner and outer diameters of the seal ring 3, which does not hinder the compression deformation of the seal ring 3. In the present embodiment, the seal ring 3 is a pre-formed member, the formed seal ring 3 is sleeved on the first mounting portion 211 and pressed against the housing 1 by the first abutting portion 212. The seal ring 3 may be formed by applying an instant adhesive to a portion between the first abutting portion 212 and the first mounting portion 211.

The first fixing portion 22 is provided around the first abutting portion 212. In the present embodiment, the first fixing portion 22 includes a groove portion 221, and the second fixing portion 12 is a protruding portion, which facilitates positioning of the cover and the groove and improvement of the sealing.

Figure 3:
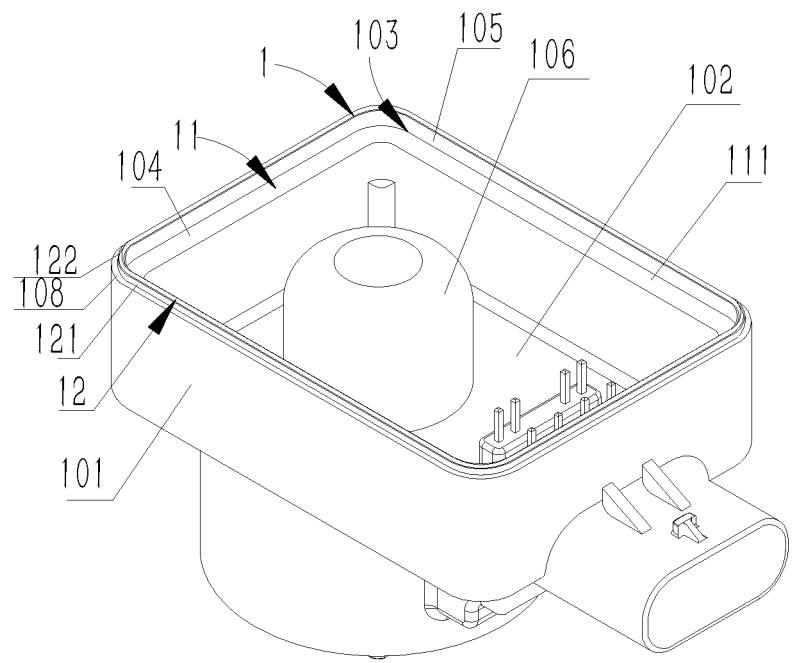
FIG. 3 is a perspective view showing the structure of a combination of a housing and a stator assembly shown in FIG. 1.
Figure 4:
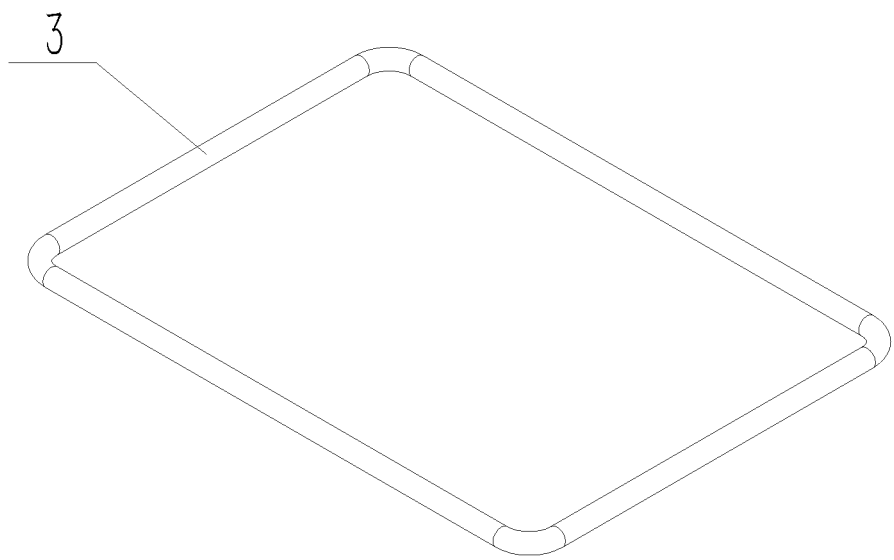
FIG. 4 is a perspective view showing the structure of a seal ring shown in FIG. 1.

Referring to FIGS. 1 and 3, the housing 1 includes a side wall 101 and a bottom 102, and an inner cavity of the housing is formed by the side wall 101 and the bottom 102. The side wall 101 includes a stepped portion 103 formed by sinking a free end of the side wall 101 toward the bottom 102. The stepped portion 103 includes a stepped surface 104 and a side surface 105. The stepped surface 104 extends substantially in the radial direction of the electric valve, and the side surface 105 extends substantially along the axial direction of the electric valve. The actual product may have certain manufacturing tolerances. The second position-limiting portion 11 and the second fixing portion 12 are formed on the side wall 101. The second position-limiting portion 11 includes a second abutting portion 111, the second abutting portion 111 includes the stepped surface 104, and the seal ring 3 is compressed by the first abutting portion 212 and the stepped surface 104, so that the seal ring 3 is axially deformed. The stepped surface 104 is annular, and a width of the stepped surface 104 is slightly larger than the distance between the inner and outer diameters of the seal ring 3 to facilitate deformation of the seal ring 3 after being compressed.

The second fixing portion 12 includes a protruding portion 121 formed by the free end of the side wall 101. An inner side surface of the protruding portion 121 is provided in alignment with the side surface 105 of the stepped portion 103, which facilitates the assembly of the housing 1 and the cover 2. A gap is formed between the inner and outer side surfaces of the protruding portion 121 and the groove portion of the first fixing portion 22, which facilitates the mounting, and a welding flash groove 210 is formed at the same time. The welding flash groove can accommodate excess materials, increase welding contact areas, and improve the connection strength of the welding.

The second fixing portion 12 further includes a rib portion 122 provided at a free end of the protruding portion 121. A cross-section of the rib portion 122 is gradually reduced from the free end of the protruding portion 121 to a top portion of the rib portion 122, that is, the rib portion 122 is integrally formed with the protruding portion 121. In the radial direction of the electric valve, the cross-sectional area of the rib portion 122 is gradually reduced from the connecting portion of the rib portion 122 and the protruding portion 121 to the free end of the rib portion 122, which on the one hand is advantageous in improvement of the connection strength of the rib portion 122 and the protruding portion 121, and on the other hand is advantageous for energy saving and reducing the influence on other parts of the cover and the housing, because the top of the rib portion 122 is in contact with the first fixing portion 22 of the cover 2, and the cross section of the top of the rib portion 122 is small, and the energy required to melt and fix the rib portion 122 by welding is small.

The second fixing portion 12 is fixed to the first fixing portion 22 at the rib portion 122 by welding, the rib portion 122 is melted after welding, and the excess material of the rib portion 122 enters the welding flash groove, that is, at least part of the rib portion 122 enters the flash groove after being melted.

The bottom 102 is formed with an isolation portion 106. The isolation portion 106 is configured to isolate the circuit board assembly 30 from the sleeve 40, so that when the electric valve is in operation, the isolation portion 106 can isolate the dewdrops of the sleeve 40 caused by the temperature change from entering the case 80, thereby further improving the sealing property of the circuit board assembly 30 and prolonging the service life of the circuit board assembly. The circuit board assembly 30 includes a circuit board 301 and electrical components. The circuit board 301 is provided with a by hole, and the isolation portion 106 passes by the by hole, so that the circuit board can be as close as possible to the stator assembly. The circuit board is connected to the stator assembly by connection terminals, which can reduce the length of the connection terminals and is advantageous for improving the reliability and stability of the connection.

Figure 5:
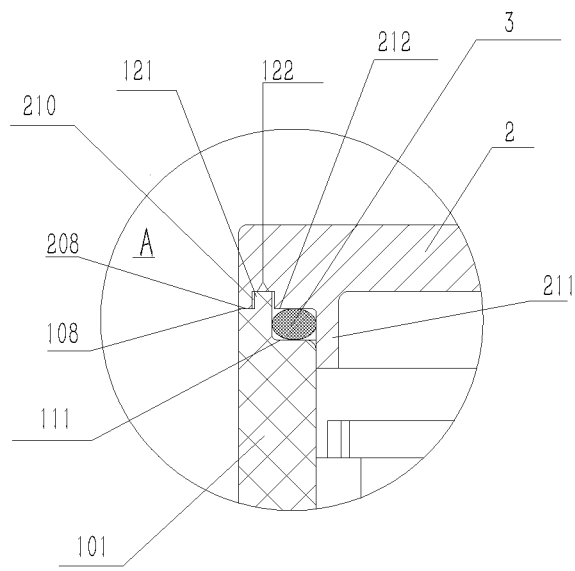
FIG. 5 is a partial enlarged view of a portion A shown in FIG. 1.

Referring to FIG. 5, the seal ring 3 is assembled with the cover 2, and the assembly of the cover 2 and the seal ring 3 is mounted to the housing 1. The periphery of the first mounting portion 211 of the cover 2 is limited to an inner boundary of the side wall 101. The protruding portion 121 of the second fixing portion 12 is inserted into the groove portion 221 of the first fixing portion 22, and the flash groove 210 is formed between the protruding portion 121 and the groove portion 221. After the ultrasonic welding, the rib portion 122 is melted to form a welded joint between the first fixing portion 22 and the second fixing portion 12. The seal ring 3 is compressed and deformed by the first abutting portion 212 and the second abutting portion 111 to form a sealing portion, and position-limiting portions of the cover 2 and the housing 1 are formed at an outer edge of the sealing portion. The position-limiting portions include a sidewall free end 108 of the housing 1 and an outer edge portion 208 of the cover 2. The position-limiting portions are configured to limit a relative distance between the cover 2 and the housing 1 after the welding, so as to ensure the compression deformation of the seal ring and ensure the sealing.

Figure 7:
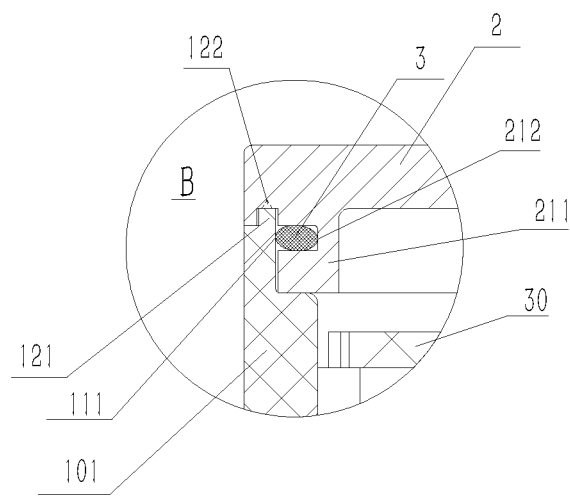
FIG. 7 is a partial enlarged view of a portion B shown in FIG. 6.
Figure 8:
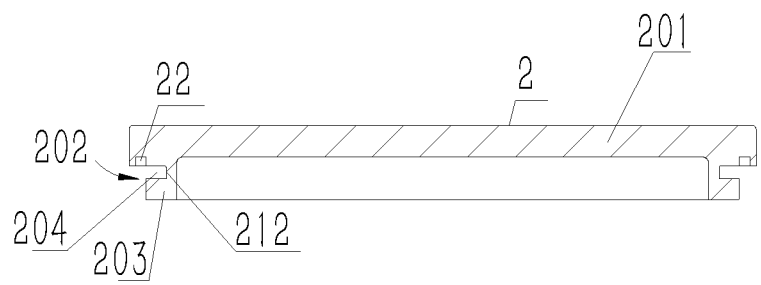
FIG. 8 is a schematic view showing the structure of the cover shown in FIG. 6.

FIG. 6 is a schematic view showing the structure of the second embodiment of the electric valve, Referring to FIGS. 6 to 8, the main difference from the first embodiment is the manner of limiting the seal ring. In the present embodiment, the cover 2 includes the base 201 and the connecting portion 202. The connecting portion 202 includes the annular protrusion 203. The annular protrusion 203 is formed by protruding from the base 201. The circumference of the annular protrusion 203 is formed with a mounting groove 204. In the present embodiment, the first position-limiting portion 21 includes the first mounting portion 211 and the first abutting portion 212. The first mounting portion 211 includes the annular protrusion 203 integrally formed with the base 201 of the cover and the mounting groove 204 provided in the annular protrusion, the seal ring 3 is accommodated in the mounting groove 204, and the outer edge of the seal ring 3 protrudes from an outer wall of the annular protrusion. The first abutting portion 212 is formed on a bottom surface of the mounting groove 204, the seal ring 3 is limited by two side walls of the mounting groove 204, and the annular protrusion 203 of the cover 2 is limited by the stepped surface 104 of the housing 1. The second abutting portion 111 is formed on the side surface 105 of the stepped portion, and the seal ring 3 is compressed and deformed by the second abutting portion 111 and the first abutting portion 212 to form the sealing portion. In the present embodiment, the sealing portion is formed by the cover 2 and the housing 1 on the side surface, that is, the sealing portion is formed in the radial direction of the electric valve, so that the limiting performance between the seal ring 3 and the cover is better, and it will not cause the deformation of the seal ring 3 to be insufficient or excessive due to insufficient pressure when welding the cover 2 and the housing 1. The insufficient or excessive deformation of the seal ring 3 results in a decrease in the sealing property between the cover and the housing.

In the present embodiment, referring to FIG. 3, the housing 1 includes the side wall 101 and the bottom 102, and the inner cavity of the housing is formed by the side wall 101 and the bottom 102. The side wall 101 includes the stepped portion 103 formed by sinking the free end of the side wall 101 toward the bottom 102, and the stepped portion 103 includes the stepped surface 104 and the side surface 105. The second abutting portion 111 includes the side surface 105. The seal ring 3 is compressed between the first abutting portion 212 and the side surface 105. The stepped surface 104 is annular, and the stepped surface 104 is in contact with the annular protrusion 203 of the cover 2.

It should be understood that the above embodiments are only intended to illustrate the present application and not to limit the technical solutions described in the present application. Although the present specification has been described in detail with reference to the embodiments described above, it should be understood by those skilled in the art that, various modifications and equivalents can be made to the technical solutions of the present application without departing from the spirit and scope of the present application, all of which should be contained within the scope of the claims of the present application.

The invention claimed is:

1. An electric valve, comprising a stator assembly, a rotor, and a valve assembly, the stator assembly being provided around the rotor, the electric valve being formed with a valve port, and the rotor being configured to drive the valve assembly to move relative to the valve port, wherein
the electric valve further comprises a case and a circuit board assembly, the stator assembly is electrically connected with the circuit board assembly, the circuit board assembly is provided in an inner cavity of the case formed by the case, the case comprises a housing and a cover, the housing is not integrally formed with the cover, the electric valve further comprises a seal ring, the seal ring is compressed between the housing and the cover, the cover is fixedly connected with the housing by welding, and the housing is directly connected to the valve assembly;
the electric valve further comprises a sleeve configured to isolate the stator assembly from the rotor; and wherein
the cover comprises a first position-limiting portion and a first fixing portion, the housing comprises a second position-limiting portion and a second fixing portion, the seal ring is provided between the first position-limiting portion and the second position-limiting portion and is compressed by the first position-limiting portion and the second position-limiting portion, the first fixing portion is welded to the second fixing portion to form a fixing connection portion, and the fixing connection portion is located at an outer periphery of the seal ring.

2. The electric valve according to claim 1, wherein
the first position-limiting portion comprises a first mounting portion and a first abutting portion, the first mounting portion comprises an annular protrusion, the first abutting portion is provided on a periphery of the first mounting portion, the seal ring is sleeved on the periphery of the first mounting portion, and the seal ring is axially pressed against the second position-limiting portion by the first abutting portion;
the housing comprises a side wall and a bottom, an inner cavity of the housing is formed by the side wall and the bottom, and the inner cavity of the case comprises the inner cavity of the housing; and
the side wall is formed with a stepped portion, the stepped portion is recessed from a free end of the side wall toward the bottom, the stepped portion comprises a stepped surface and a side surface, the second position-limiting portion comprises a second abutting portion, the second abutting portion comprises the stepped surface, and the seal ring is compressed by the first abutting portion and the stepped surface.

3. The electric valve according to claim 1, wherein
the first position-limiting portion comprises a first mounting portion and a first abutting portion, the first mounting portion comprises an annular protrusion and a mounting groove, the seal ring is accommodated in the mounting groove, the first abutting portion is formed by a bottom of the mounting groove, and the seal ring is radially pressed against the second position-limiting portion by the first abutting portion; and
the housing comprises a side wall and a bottom, an inner cavity of the housing is formed by the side wall and the bottom, the second position-limiting portion comprises a second abutting portion, the side wall is formed with a stepped portion, the stepped portion is recessed from a free end of the side wall toward the bottom, the stepped portion comprises a stepped surface and a side surface, the second abutting portion comprises the side surface, and the seal ring is compressed by the first abutting portion and the side surface.

4. The electric valve according to claim 2, wherein the first fixing portion is provided on a periphery of the first position-limiting portion in a radial direction, the first fixing portion comprises a groove portion, the second fixing portion comprises a protruding portion formed on the side wall, the protruding portion is provided around the second position-limiting portion, and the protruding portion is inserted into and fixedly connected to the groove portion.

5. The electric valve according to claim 4, wherein
the second fixing portion further comprises a rib portion provided at a free end of the protruding portion, and the rib portion is integrally formed with the protruding portion;
in a radial direction of the electric valve, a cross-sectional area of the rib portion is gradually reduced from a connecting portion of the rib portion and the protruding portion to a free end of the rib portion, the second fixing portion is fixed to the first fixing portion at the rib portion by welding, and at least a part of the rib portion is melted after the welding.

6. The electric valve according to claim 5, wherein an annular gap is formed between the protruding portion and a side wall of the groove portion, the annular gap is a flash groove, and the melted part of the rib portion is configured to enter the flash groove, and a volume of the flash groove is larger than or equal to a volume of the rib portion.

7. The electric valve according to claim 1, wherein the housing comprises a side wall and a bottom, an inner cavity of the housing is formed by the side wall and the bottom, the inner cavity of the case comprises the inner cavity of the housing, the side wall is fixedly connected to the cover, the cover comprises a first fixing portion, the first fixing portion comprises a groove portion, the housing comprises a second fixing portion, the second fixing portion comprise a protruding portion formed on the side wall, and the protruding portion is inserted into and fixedly connected to the groove portion.

8. The electric valve according to claim 7, wherein
the second fixing portion further comprises a rib portion provided at a free end of the protruding portion, the rib portion is integrally formed with the protruding portion, in a radial direction of the electric valve, a cross-sectional area of the rib portion is gradually reduced from a connecting portion of the rib portion and the protruding portion to a free end of the rib portion, the second fixing portion is fixed to the first fixing portion at the rib portion by welding, and at least a part of the rib portion is melted after the welding; and
an annular gap is formed between the protruding portion and a side wall of the groove portion, the annular gap is a flash groove, and the melted part of the rib portion is configured to enter the flash groove, and a volume of the flash groove is larger than or equal to a volume of the rib portion.

9. The electric valve according to claim 3, wherein the first fixing portion is provided on a periphery of the first position-limiting portion in a radial direction, the first fixing portion comprises a groove portion, the second fixing portion comprises a protruding portion formed on the side wall, the protruding portion is provided around the second position-limiting portion, and the protruding portion is inserted into and fixedly connected to the groove portion.

\* \* \* \* \*